United States Patent
Ruxton et al.

(10) Patent No.: US 9,380,353 B1
(45) Date of Patent: Jun. 28, 2016

(54) METHODS, SYSTEMS, AND MEDIA FOR GENERATING AN ADVERTISEMENT FROM A VIDEO STREAM

(71) Applicant: Google Inc., Mountain View, CA (US)

(72) Inventors: Adam Ruxton, San Francisco, CA (US); Sean Ivester, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/703,577

(22) Filed: May 4, 2015

(51) Int. Cl.
*H04N 7/10* (2006.01)
*H04N 7/025* (2006.01)
*H04N 21/81* (2011.01)
*H04N 21/41* (2011.01)
*H04N 21/234* (2011.01)

(52) U.S. Cl.
CPC ....... *H04N 21/812* (2013.01); *H04N 21/23424* (2013.01); *H04N 21/4122* (2013.01)

(58) Field of Classification Search
CPC .......... H04N 21/812; H04N 21/23424; H04N 21/4122
See application file for complete search history.

(56) References Cited

U.S. PATENT DOCUMENTS

| | | | | |
|---|---|---|---|---|
| 2011/0093783 A1* | 4/2011 | Parra | ...... | G06Q 30/02 715/719 |
| 2013/0347032 A1* | 12/2013 | Geraci | ...... | H04N 21/23424 725/34 |
| 2014/0173653 A1* | 6/2014 | Waibel | ...... | H04N 21/435 725/34 |

* cited by examiner

*Primary Examiner* — Oleg Asanbayev
(74) *Attorney, Agent, or Firm* — Byrne Poh LLP (57) ABSTRACT

Methods, systems, and media for generating an advertisement from a video stream are provided. In accordance with some embodiments, the method comprises: receiving, from a first user device, advertisement parameters associated with an advertisement campaign for placing an advertisement based on the advertisement parameters, wherein the advertisement parameters include one or more keywords; associating the advertisement parameters with an identifier of the first user device; receiving, from the first user device, a live video stream; receiving, from a second user device, a request to present an advertisement; identifying the live video stream based at least in part on the one or more keywords; generating the advertisement using the live video stream and the advertisement parameters; and causing the advertisement to be presented on the second user device as the advertisement.

12 Claims, 6 Drawing Sheets

METHODS, SYSTEMS, AND MEDIA FOR GENERATING AN ADVERTISEMENT FROM A VIDEO STREAM

TECHNICAL FIELD

The disclosed subject matter relates to methods, systems, and media for generating an advertisement from a video stream.

BACKGROUND

Advertisements that include video can be an effective method of advertising a business and/or a service. However, it can be difficult to create and/or produce a video advertisement. For example, producing a video advertisement can sometimes require expensive and/or difficult to use video editing equipment.

Accordingly, it is desirable to provide methods, systems, and media for generating an advertisement from a video stream.

SUMMARY

Methods, systems, and media for generating an advertisement from a video stream are provided.

In accordance with some embodiments of the disclosed subject matter, a method for generating an advertisement from a video stream is provided, the method comprising: receiving, from a first user device, advertisement parameters associated with an advertisement campaign for placing an advertisement based on the advertisement parameters, wherein the advertisement parameters include one or more keywords; associating the advertisement parameters with an identifier of the first user device; receiving, from the first user device, a live video stream; receiving, from a second user device, a request to present an advertisement; identifying the live video stream based at least in part on the one or more keywords; generating the advertisement using the live video stream and the advertisement parameters; and causing the advertisement to be presented on the second user device as the advertisement.

In accordance with some embodiments of the disclosed subject matter, a system for generating an advertisement from a video stream is provided, the system comprising: a hardware processor that is programmed to: receive, from a first user device, advertisement parameters associated with an advertisement campaign for placing an advertisement based on the advertisement parameters, wherein the advertisement parameters include one or more keywords; associate the advertisement parameters with an identifier of the first user device; receive, from the first user device, a live video stream; receive, from a second user device, a request to present an advertisement; identify the live video stream based at least in part on the one or more keywords; generate the advertisement using the live video stream and the advertisement parameters; and cause the advertisement to be presented on the second user device as the advertisement.

In accordance with some embodiments of the disclosed subject matter, a non-transitory computer-readable medium containing computer executable instructions that, when executed by the processor, cause the processor to perform a method for generating an advertisement from a video stream is provided. The method comprises: receiving, from a first user device, advertisement parameters associated with an advertisement campaign for placing an advertisement based on the advertisement parameters, wherein the advertisement parameters include one or more keywords; associating the advertisement parameters with an identifier of the first user device; receiving, from the first user device, a live video stream; receiving, from a second user device, a request to present an advertisement; identifying the live video stream based at least in part on the one or more keywords; generating the advertisement using the live video stream and the advertisement parameters; and causing the advertisement to be presented on the second user device as the advertisement.

In accordance with some embodiments of the disclosed subject matter, a system for generating an advertisement from a video stream is provided, the system comprising: means for receiving, from a first user device, advertisement parameters associated with an advertisement campaign for placing an advertisement based on the advertisement parameters, wherein the advertisement parameters include one or more keywords; means for associating the advertisement parameters with an identifier of the first user device; means for receiving, from the first user device, a live video stream; means for receiving, from a second user device, a request to present an advertisement; means for identifying the live video stream based at least in part on the one or more keywords; means for generating the advertisement using the live video stream and the advertisement parameters; and means for causing the advertisement to be presented on the second user device as the advertisement.

In some embodiments, the system further comprises means for performing an action based on the advertisement parameters in response to determining that a portion of the live video stream has been selected on the second user device.

In some embodiments, the action includes presenting directions to a location associated with the live video stream.

In some embodiments, the advertisement parameters include text, and the advertisement includes text presented in connection with the live video stream on the second user device.

In some embodiments, the advertisement parameters include an indication of a time delay, and the system further comprises means for determining whether a period of time equivalent to the time delay has elapsed prior to causing the live video stream to be presented on the second user device.

In some embodiments, the advertisement parameters include an indication of a time delay, and the system further comprises: means for receiving, from the first user device, an indication to delete the live video stream within a time period less than the time delay; and means for inhibiting presentation of the live video stream on the second user device.

In some embodiments, the system further comprises: means for receiving, from the first user device, an image; and means for determining that the advertisement is to be presented on the second user device is to include a still image based at least in part on the request received from the second user device, wherein the means for generating the advertisement comprise means for using the image.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for generating an advertisement from a video stream are provided.

In some embodiments, the mechanisms described herein can receive a live video stream from a first user device and can generate an advertisement using the live video stream. The generated advertisement can then be presented on a second user device.

In some embodiments, the mechanisms described herein can receive, from the first user device, one or more advertisement parameters associated with an advertising campaign that includes an advertisement or a group of advertisements. For example, in some embodiments, the advertisement parameters can include keywords indicating a topic of the live video stream, a location associated with the live video stream, a name of a business associated with the live video stream, and/or any other suitable information. As another example, the advertisement parameters can include text that is to be overlaid on the live video stream in the advertisement. As yet another example, the advertisement parameters can include an action that is to be performed. As a more particular example, the action can include presenting directions to a location associated with the advertisement (e.g., at a particular time point during presentation of the advertisement, in response to determining that a portion of the advertisement has been selected, and/or in any other suitable manner). As still another example, the advertisement parameters can include pricing information associated with the advertisement, such as a bidding price to present the advertisement, and/or any other suitable pricing information. In some embodiments, the advertisement parameters can be associated with an identifier of the first user device.

Note that, although the advertisement is described herein as including a live video stream, in some embodiments, the advertisement can include any suitable type of content. For example, in some embodiments, the advertisement can include a pre-recorded video item, a live audio stream, a pre-recorded audio stream, a still image, and/or any other suitable type of content.

Figure 1:
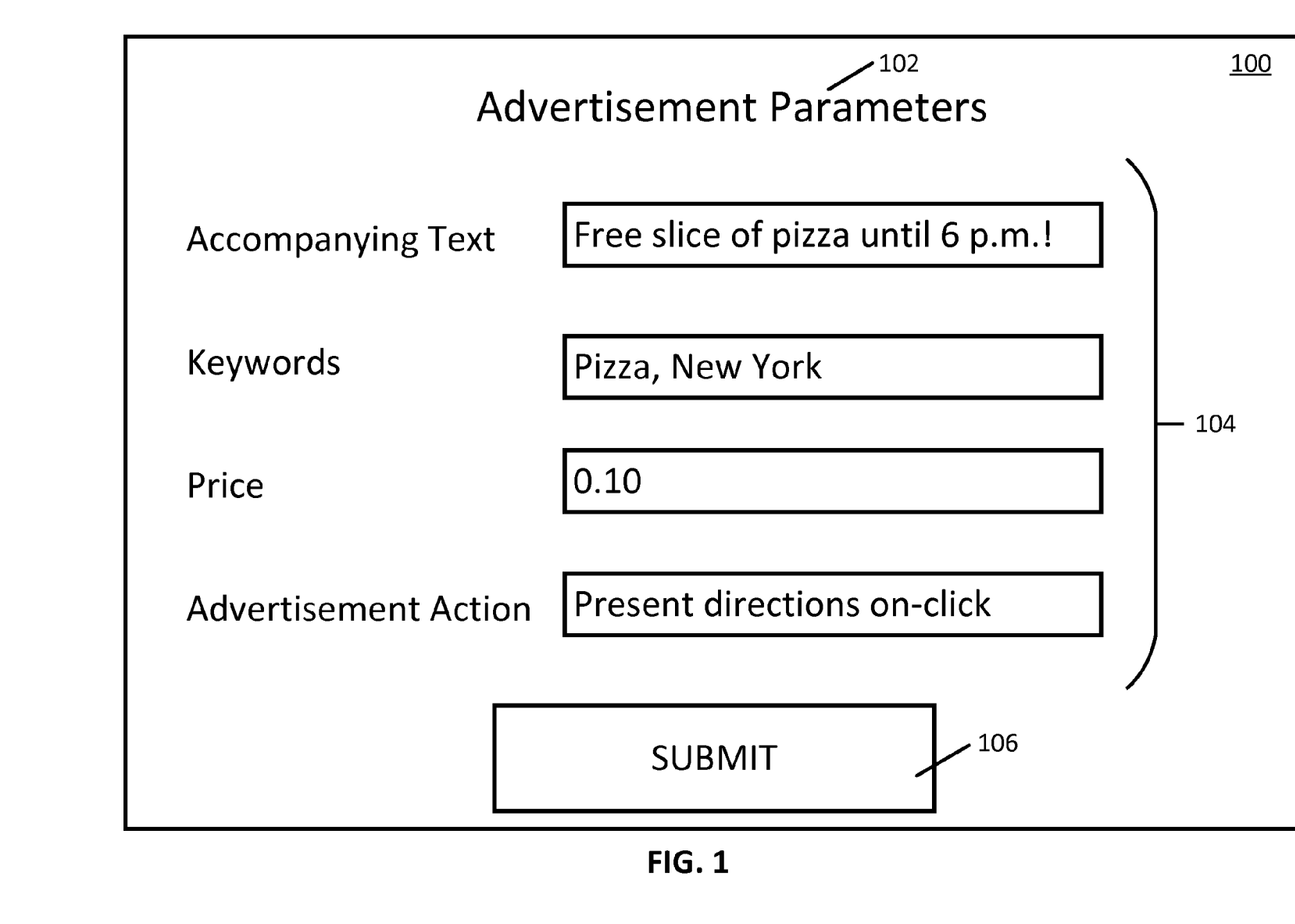
FIG. 1 shows an example of a user interface for receiving advertisement parameters in accordance with some embodiments of the disclosed subject matter.

Turning to FIG. 1, an example 100 of a user interface for receiving advertisement parameters is shown in accordance with some embodiments of the disclosed subject matter. As illustrated, user interface 100 can include a title 102, a group of advertisement parameters 104, and an input to submit parameters 106.

Title 102 can include any suitable title indicating content of user interface 100. In some embodiments, title 102 can include any suitable text, images, graphics, icons, animations, hyperlinks, and/or any other suitable content. Note that the position of title 102 in user interface 100 is an example, and title 102 can be located at any suitable position. In some embodiments, title 102 can be omitted.

Group of advertisement parameters 104 can include any suitable inputs for indicating parameters associated with an advertisement and/or a group of advertisements. For example, as shown in FIG. 1 and described below in connection with FIGS. 5 and 6, group of advertisement parameters can include text that is to accompany presentation of an advertisement, keywords associated with an advertisement, a price associated with an advertisement (e.g., a maximum price to be paid per presentation of the advertisement, a price to be paid for a particular number of presentations of the advertisement, and/or any other suitable price), an action associated with an advertisement (e.g., causing directions to a location associated with the advertisement to be presented, and/or any other suitable action), and/or any other suitable parameters. In some embodiments, group of advertisement parameters 104 can include any suitable user interface elements, such as text boxes, drop-down menus, checkboxes, radio buttons, and/or any other suitable user interface elements. Note that although four advertisement parameters are included in group of advertisement parameters 104, in some embodiments, any suitable number (e.g., zero, two, five, ten, and/or any other suitable number) can be included.

Input to submit parameters 106 can be a selectable user interface element that, when selected, causes data associated with group of advertisement parameters 104 to be transmitted, for example, to an advertisement server (e.g., as shown in and described below in connection with FIG. 3). In some embodiments, input to submit parameters 106 can include any suitable text, images, icons, graphics, animations, and/or any other suitable content. In some embodiments, input to submit parameters 106 can be omitted.

Figure 2A:
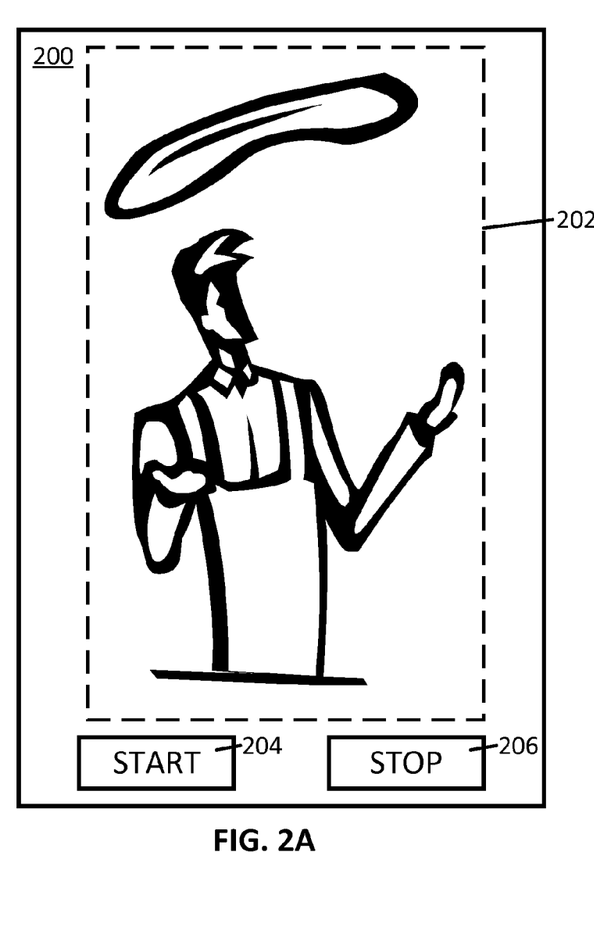
FIG. 2A shows an example of a user interface for recording a live video stream in accordance with some embodiments of the disclosed subject matter.

Turning to FIG. 2A, an example 200 of a user interface for recording and transmitting a live video stream is shown in accordance with some embodiments of the disclosed subject matter. As illustrated, user interface 200 can include recorded video 202, a start input 204, and a stop input 206.

Recorded video 202 can be any suitable presentation of a video that is currently being recorded by a user device presenting user interface 200. For example, in some embodiments, recorded video 202 can show a portion of an external scene that is currently being captured by a camera associated with the user device.

Start input 204 and stop input 206 can be used to control recording of a video. For example, in some embodiments, selection of start input 204 can cause video to begin being recorded by a camera associated with a user device presenting user interface 200. In some embodiments, selection of start input 204 can cause the live video stream to begin being transmitted to a server, such as an advertisement server, as shown in and described below in connection with FIG. 3. As another example, in some embodiments, selection of stop input 206 can cause recording of a video to be stopped.

Note that, in some embodiments, any other suitable user interface elements can be included to control recording of a video. For example, in some embodiments, user interface 200 can include user interface elements that allow a portion of screen showing a video recording to be zoomed in or zoomed out. As another example, in some embodiments, user interface 200 can include user interface elements that allow simultaneous audio recording to be turned on or off.

Figure 2B:
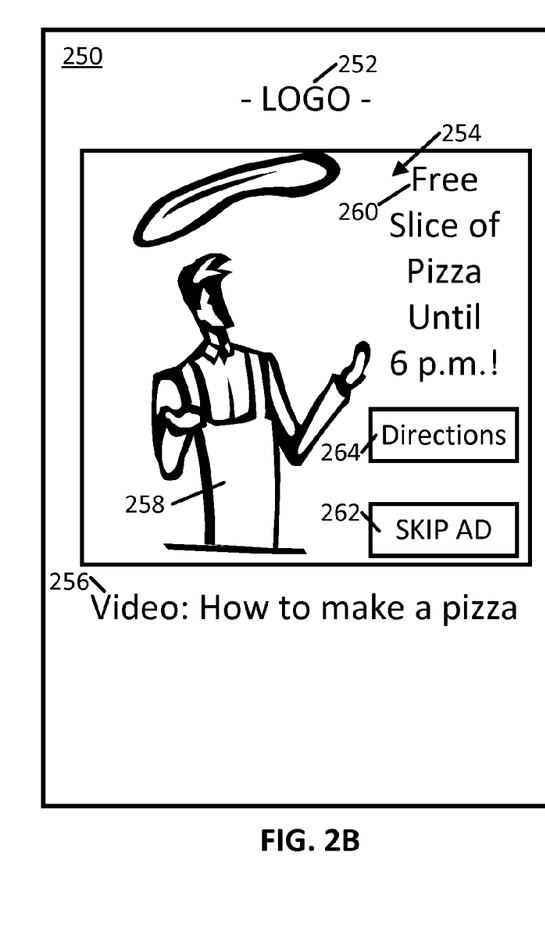
FIG. 2B shows an example of a user interface for presenting an advertisement that includes a live video stream in accordance with some embodiments of the disclosed subject matter.

Turning to FIG. 2B, an example 250 of a user interface for presenting an advertisement that includes a live video stream is shown in accordance with some embodiments of the disclosed subject matter. As illustrated, user interface 250 can include a logo 252, an advertisement 254, and a content title 256.

Logo 252 can be any suitable logo associated with a provider of user interface 250. In some embodiments, logo 252 can include any suitable text, images, icons, graphics, animations, hyperlinks, and/or any other suitable content. Note that the position of logo 252 in user interface 250 is shown as an example, and logo 252 can be located at any suitable position. In some embodiments, logo 252 can be omitted.

Advertisement 254 can be any suitable advertisement presented on a user device. For example, as shown in FIG. 2B, advertisement 254 can include a live video stream 258 presented as a pre-roll advertisement prior to presentation of other media content (e.g., such as a video, a movie, a television program, and/or any other suitable media content). Note that, although advertisement 254 is shown as including live video stream 258, in some embodiments, advertisement 254 can include a previously recorded video stream, an audio recording, a still image, and/or any other suitable content.

In some embodiments, advertisement 254 can include any other suitable content, such as text 260, skip advertisement input 262, and action input 264. Text 260 can include any suitable text, such as text received from a group of advertisement parameters, as shown in and described above in connection with FIG. 1. In some embodiments, text 260 can be presented in any suitable position relative to live video stream 258. In some embodiments, text 260 can be omitted.

Skip advertisement input 262 can include any suitable user interface element that, when selected, causes presentation of the advertisement to be stopped and causes other content (e.g., a video, a television program, an audiobook, a document, and/or any other suitable content) to be presented. In some embodiments, skip advertisement input 262 can be presented and/or activated in response to determining that at least a predetermined amount of time (e.g., ten seconds, thirty seconds, and/or any other suitable time) has elapsed since presentation of advertisement 254 began.

Action input 264 can be any suitable text, image, hyperlink, and/or user interface element that, when selected, causes an action to be performed. For example, in some embodiments, selection of action input 264 can cause directions to a location associated with the advertisement to be presented (e.g., in a new browser tab, in a new browser window, in a pop-up window, and/or in any other suitable manner). As another example, in some embodiments, selection of action input 264 can cause a phone number associated with the advertisement (e.g., a phone number of a business associated with the advertisement, and/or any other suitable phone number) to be dialed from a user device presenting user interface 250. As yet another example, in some embodiments, selection of action input 264 can cause a page presenting information (e.g., a website corresponding to a business associated with the advertisement, a page presenting a coupon associated with the advertisement, and/or any other suitable information) to be presented. Note that, in some embodiments, action input 264 can be omitted. In some such embodiments, an action can be performed without user interaction. For example, in some embodiments, an action can be performed at any suitable time point during presentation of the advertisement, as described below in connection with FIG. 5.

Content title 256 can indicate a topic of content that is to be presented after and/or concurrently with advertisement 254. For example, in instances where advertisement 254 is presented prior to and/or during presentation of a video, content title 256 can indicate a title of the video, as shown in FIG. 2B. In some embodiments, content title 256 can be omitted.

Figure 3:
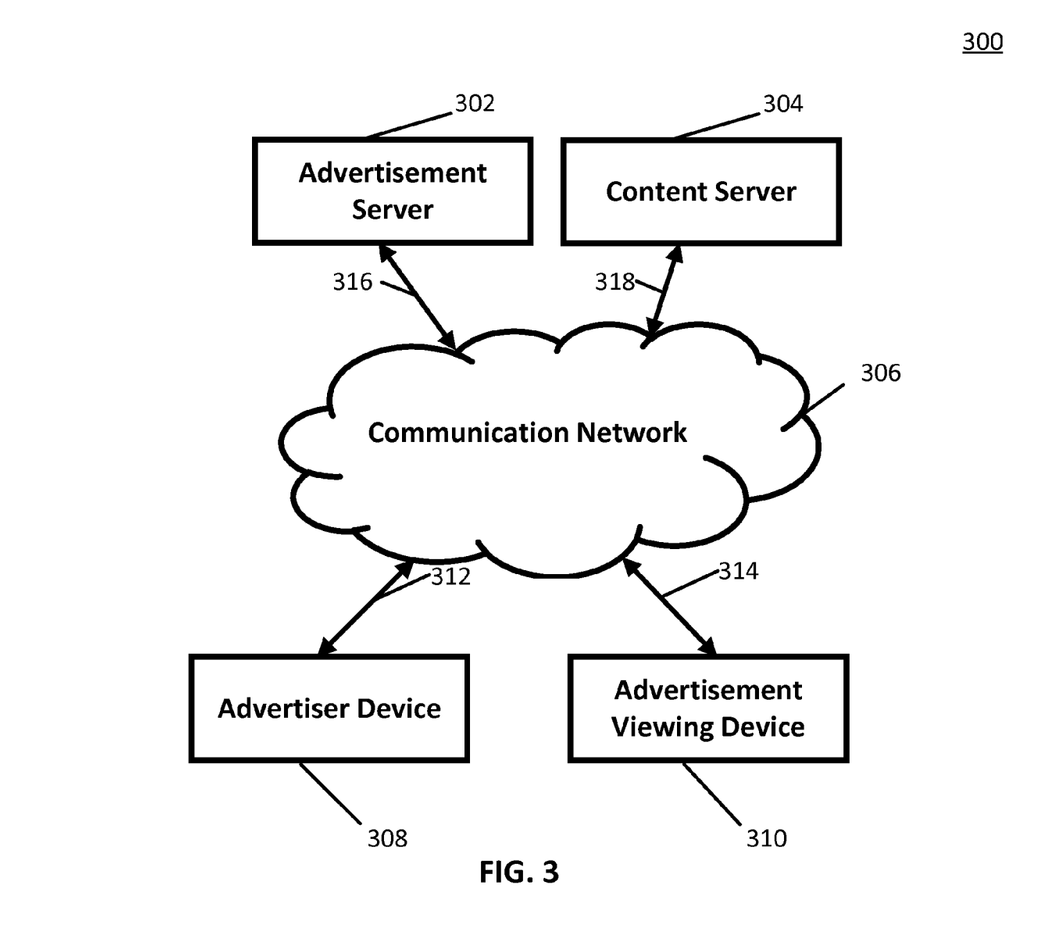
FIG. 3 shows a schematic diagram of an illustrative system suitable for implementation of mechanisms described herein for generating an advertisement from a video stream in accordance with some embodiments of the disclosed subject matter.

Turning to FIG. 3, an example 300 of hardware for generating an advertisement using a live video stream that can be used in accordance with some embodiments of the disclosed subject matter is shown. As illustrated, hardware 300 can include one or more servers such as an advertisement server 302 and a content server 304, as well as a communication network 306, and/or one or more user devices, such as an advertiser device 308 and an advertisement viewing device 310.

In some embodiments, advertisement server 302 can be any suitable server for receiving advertisement parameters and a live video stream from advertiser device 308 and for generating an advertisement using the live video stream. For example, in some embodiments, advertisement server 302 can receive advertisement parameters that include one or more keywords, and can identify a received live video stream to be included in an advertisement based on the keywords, as described below in connection with FIGS. 5 and 6. In some embodiments, advertisement server 302 can be omitted.

In some embodiments, content server 304 can be any suitable server for storing media content and/or delivering such media content to advertisement viewing device 310. For example, content server 304 can be a server that streams and/or otherwise transmits media content to advertisement viewing device 310 via communication network 306. Media content provided by content server 304 can be any suitable content, such as video content, audio content, electronic books, documents, images, and/or any other suitable type of media content. As a more particular example, media content can include television programs, movies, cartoons, sound effects, live-streamed content (e.g., a streaming radio show, a live concert, and/or any other suitable type of streaming live content), and/or any other suitable type of media content. Media content can be created and/or uploaded to content server 304 by any suitable entity. For example, in some embodiments the media content can include user-generated content. As another example, in some embodiments, the media content can include content created and/or uploaded by a particular group and/or channel. In some embodiments, content server 304 can be omitted.

Communication network 306 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 308 and 310 can be connected by one or more communications links, such as links 312 and 314, to communication network 306 that can be linked via one or more communications links (e.g., communications links 316 and/or 318) to advertisement server 302 and content server 304. Communications links 312, 314, 316, and/or 318 can be any communications links suitable for communicating data among user devices 308 and/or 310 and servers 302 and/or 304 such as network links, dial-up links, wireless links, hard-wired links, any other suitable communications links, or any suitable combination of such links.

In some embodiments, advertiser device 308 and advertisement viewing device 310 can be any suitable user devices. In some embodiments, advertiser user device 308 can be any user device suitable for receiving advertisement parameters entered by a user, recording and transmitting a live stream of a video, and/or for performing any other suitable functions. In some embodiments, advertisement viewing device 310 can be any user device suitable for presenting an advertisement, for example, as a pre-roll video, as an image, and/or in any other suitable manner. In some embodiments, advertiser device 308 and advertisement viewing device 310 can be implemented as a mobile device, such as a smartphone, mobile phone, a tablet computer, a wearable computer, a laptop computer, a vehicle (e.g., a car, a boat, an airplane, or any other suitable vehicle) entertainment system, a portable media player, and/or any other suitable mobile device. As another example, in some embodiments, advertiser device 308 and advertisement viewing device 310 can be implemented as a non-mobile device such as a desktop computer, a set-top box, a television, a streaming media player, a game console, and/or any other suitable non-mobile device.

Although advertisement server 302 and content server 304 are illustrated as separate devices, the functions performed by advertisement server 302 and content server 304 can be performed using any suitable number of devices in some embodiments. For example, in some embodiments, the functions performed by either of advertisement server 302 and content server 304 can be performed on a single server. As another example, in some embodiments, multiple devices can be used to implement the functions performed by advertisement server 302 and/or content server 304.

Although two user devices 308 and 310 are shown in FIG. 3, any suitable number of user devices, and/or any suitable types of user devices, can be used in some embodiments.

Advertisement server 302, content server 304, advertiser device 308 and advertisement viewing device 310 can be implemented using any suitable hardware in some embodiments. For example, in some embodiments, devices 302, 304, 308, and 310 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Figure 4:
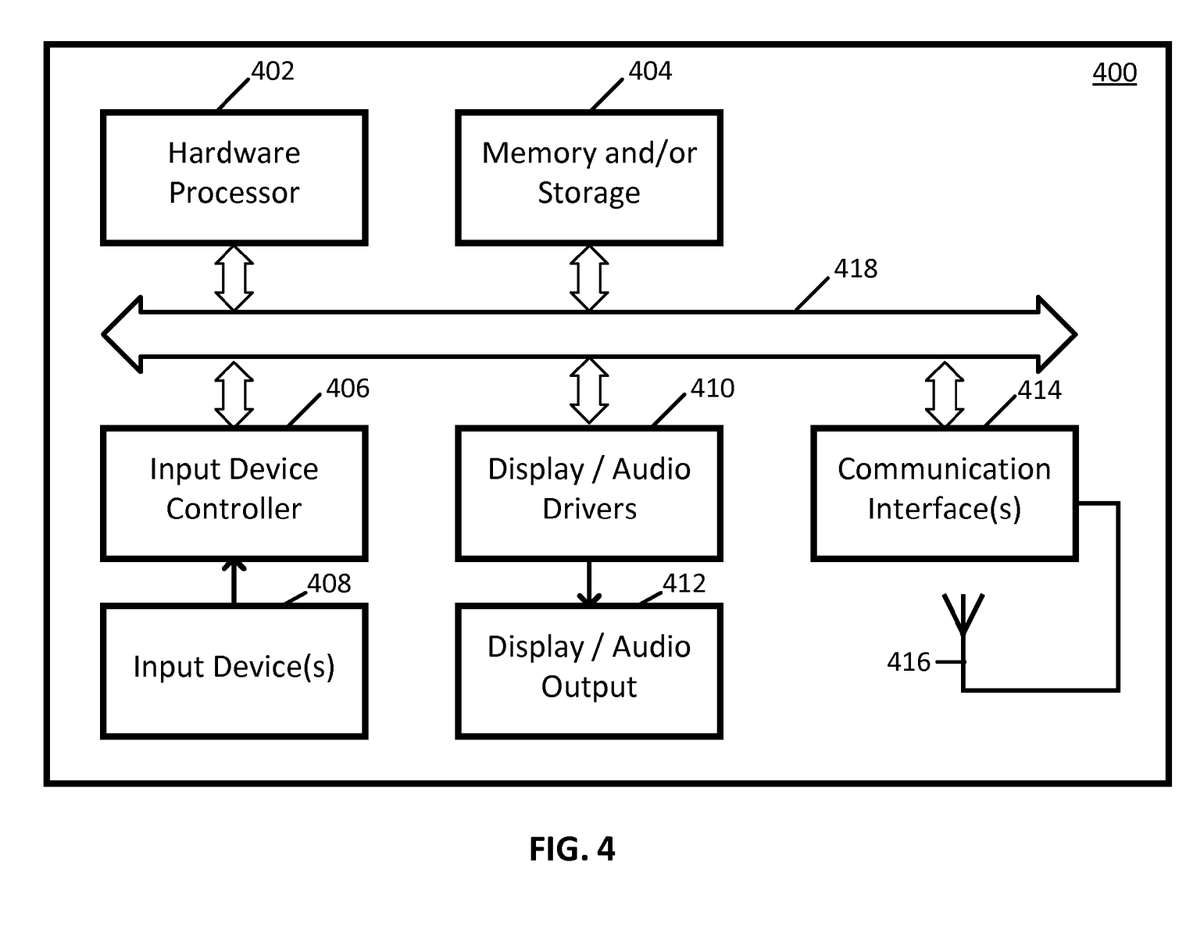
FIG. 4 shows a detailed example of hardware that can be used in a server and/or a user device of FIG. 3 in accordance with some embodiments of the disclosed subject matter.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as one of servers 302 and 304). For example, a server program on advertisement server 302 can cause hardware processor 402 to identify a particular live video stream suitable for inclusion in an advertisement based on keywords associated with the live video stream, and/or perform any other suitable actions.

In some embodiments, hardware processor 402 can be controlled by a computer program stored in memory and/or storage 404 of advertiser device 308. For example, the computer program can cause hardware processor 402 to transmit a live video stream to advertisement server 302, and/or perform any other suitable actions. In some embodiments, hardware processor 402 can be controlled by a computer program stored in memory and/or storage 404 of advertisement viewing device 310. For example, the computer program can cause hardware processor 402 to request an advertisement, present an advertisement that includes a live video stream, and/or perform any other suitable actions.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 306 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 306) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

Figure 5:
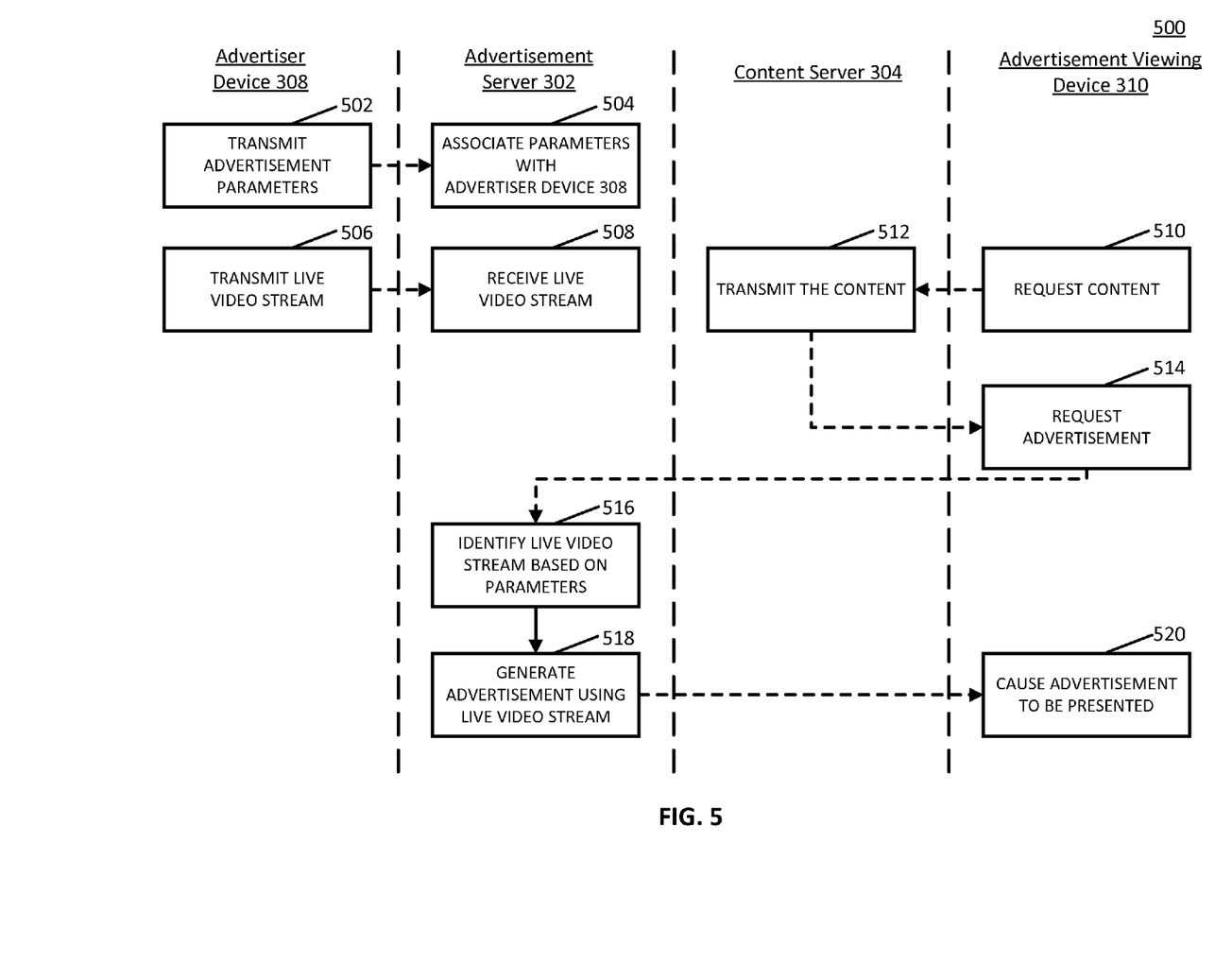
FIG. 5 shows an example of an information flow diagram for receiving a live video stream from a first user device and generating an advertisement that is to be presented on a second user device using the live video stream in accordance with some embodiments of the disclosed subject matter.

Turning to FIG. 5, an example 500 of an information flow diagram for receiving a live video stream from advertiser device 308 and causing an advertisement that includes the live video stream to be presented on advertisement viewing device 310 is shown in accordance with some embodiments of the disclosed subject matter. As illustrated, portions of information flow diagram 500 can be executed on advertiser device 308, advertisement server 302, content server 304, and advertisement viewing device 310.

At 502, advertiser device 308 can transmit advertisement parameters to advertisement server 302. In some embodiments, the advertisement parameters can be associated with an advertising campaign, which can include any suitable number of advertisements (e.g., one, two, five, ten, and/or any other suitable number). Note that, in some embodiments, the advertisements associated with the advertising campaign can include any suitable type(s) and/or combination of types of advertisements, such as live video streams, pre-recorded video streams, audio streams, text, images, and/or any other suitable types of advertisements. In some embodiments, the advertisement parameters can specify which advertisement in the group of advertisements is to be presented. For example, in some embodiments, the advertisement parameters can specify that a live video stream is to be presented if available, but if a live video stream is not available a pre-recorded video or a non-video advertisement is to be presented. As another example, in some embodiments, the advertisement parameters can specify that a particular type of advertisement is to be presented in connection with particular types of content, at particular times of day, when an advertisement slot is available at a particular price point, and/or based on any other suitable information. In some embodiments, advertiser device 308 can receive the advertisement parameters from a user via a user interface, as shown in and described above in connection with FIG. 1.

In addition to indicating which advertisement in a group of advertisements associated with an advertising campaign is to be presented, the advertisement parameters can include any other suitable information associated with an advertisement and/or a group of advertisements. For example, in some embodiments, the advertisement parameters can include text to be presented in connection with an advertisement, as shown in and described above in connection with FIG. 2B. As another example, in some embodiments, the advertisement parameters can include one or more keywords associated with the advertisement, which can be used to determine if the advertisement is to be presented on a particular user device. As a more particular example, in some embodiments, the keywords can include a topic of the advertisement, a product and/or service associated with the advertisement, a location associated with the advertisement (e.g., a location associated with a shop and/or a restaurant that is being advertised, and/or any other suitable location information), a name of an entity associated with the advertisement (e.g., a name of a shop, a name of an owner of a shop, a name of a chef at a particular restaurant, and/or any other suitable name), and/or any other suitable information. As yet another example, in some embodiments, the advertisement parameters can include a price associated with the advertisement. As a more particular example, in some embodiments, the price can include a maximum price to be paid per impression of the advertisement, and/or any other suitable price. As still another example, in some embodiments, the advertisement parameters can include an action associated with the advertisement. As a more particular example, the action can include presenting a map indicating a location associated with the advertisement in response to determining that the advertisement has been touched, clicked, and/or otherwise selected. As another more particular example, the action can include causing the user device on which the advertisement is presented to dial a phone number associated with the advertisement in response to determining that the advertisement has been selected. As yet another more particular example, the action can include causing a particular page (e.g., a website associated with an entity corresponding to the advertisement, a social networking page associated with an entity corresponding to the advertisement, and/or any other suitable page) and/or application associated with the advertisement to be presented in response to determining that the advertisement has been selected.

Note that, in instances where particular advertisement parameters are time-sensitive, the advertisement parameters can additionally include timing information. For example, in instances where text included in the advertisement parameters indicates information that is time-sensitive (e.g., that a particular promotion begins and/or ends at a particular day and/or time, and/or any other suitable timing information), the advertisement parameters can additionally include the corresponding timing information. As another example, in instances where an action included in the advertisement parameters is time-sensitive (e.g., a coupon presented upon selection of the advertisement expires at a particular time), the advertisement parameters can additionally include timing information that causes the action to be performed only within the specified time period.

At 504, advertisement server 302 can associate the received advertisement parameters with an identifier associated with advertiser device 308. For example, in some embodiments, the received advertisement parameters can be associated with a user account authenticated on advertiser device 308, an Internet Protocol (IP) address associated with advertiser device 308, and/or any other suitable identifying information, as described below in connection with block 604 of FIG. 6.

At 506, advertiser device 506 can begin transmitting a live video stream to advertisement server 302. Note that transmission of the live video stream can begin at any suitable time period after advertisement parameters have been transmitted (e.g., a minute later, a day later, a week later, and/or any other suitable time period). As described above in connection with FIG. 2A, the live video stream can be captured from a camera associated with advertiser device 308. In some embodiments, the live video stream can be transmitted to advertisement server 302 in any suitable manner. For example, in some embodiments, portions of the live video stream of any suitable duration and/or size can be transmitted sequentially to advertisement server 302. Note that, although advertiser device 506 is generally described herein as transmitting a live video stream, in some embodiments, advertiser device 506 can additionally or alternatively transmit a pre-recorded video stream, a still image, an audio recording, and/or any other suitable content.

Note that, in some embodiments, advertiser device 506 can create an advertising campaign and/or cause an advertising campaign to be created prior to recording the live video stream and/or as the live video stream is being recorded. For example, in some embodiments, a user interface requesting parameters associated with the advertising campaign can be presented in response to a "start recording" input being selected on advertiser device 506. Additionally or alternatively, in some embodiments, an advertising campaign can be created that copies advertisement parameters from a different advertising campaign associated with advertiser device 506.

At 508, advertisement server 302 can receive the live video stream. In some embodiments, advertisement server 302 can associate the received live video stream with the advertisement parameters received at block 504, as described below in connection with FIG. 6.

Note that, in some embodiments, advertiser device 506 can transmit an indication that the live video stream is to be deleted and/or not used in an advertisement. In some embodiments, the indication can be transmitted within a particular time period (e.g., within five seconds, within ten seconds, and/or within any other suitable time period). In such instances, advertisement server 302 can delete any stored and/or buffered portions of the received live video stream and can cause the live video stream to not be identified for inclusion in a potential advertisement.

At 510, advertisement viewing device 310 can request content from content server 304. In some embodiments, the content can include any suitable content, including media content (e.g., videos, television programs, movies, audio content, and/or any other suitable media content), documents, web pages, and/or any other suitable content.

At 512, content server 304 can transmit the content to advertisement viewing device 310. As described above in connection with FIG. 3, in some embodiments, content server 304 can begin streaming media content (e.g., a video, a movie, a television program, and/or any other suitable content) to advertisement viewing device 310.

At 514, advertisement viewing device 310 can request an advertisement from advertisement server 302. The advertisement can be requested in response to any particular information. For example, in some embodiments, the advertisement can be requested in response to determining that a particular duration of a streaming media content item has been presented and/or that a break in a presentation of a streaming media content item is approaching. Note that, in some embodiments, advertisement view device 310 can request the advertisement before content is received from content server 304 (e.g., before content is requested at block 510, immediately after content is requested at block 510, and/or at any other suitable time). Additionally or alternatively, in some embodiments, content server 304 can request the advertisement from advertisement server 302 in response to receiving the request for content.

At 516, advertisement server 302 can identify the live video stream for inclusion in an advertisement to be presented on advertisement viewing device 310 based on the associated advertisement parameters. For example, as described below in connection with block 610 of FIG. 6, advertisement server 302 can identify the live video stream based on keywords associated with the live video stream (e.g., based on keywords included in the advertisement parameters received at block 502) and metadata associated with content presented on advertisement viewing device 310. As another example, in some embodiments, the advertisement parameters can indicate that the live video stream is to be presented to users viewing particular content (e.g., a particular video, a particular television program, and/or any other suitable content) and/or particular types of content (media content of a particular genre, and/or any other suitable types of content).

At 518, advertisement server 302 can generate an advertisement that includes the live video stream, and can transmit the advertisement to advertisement viewing device 310. The advertisement can be generated in any suitable manner, as described below in connection with block 612 of FIG. 6.

At 520, advertisement viewing device 310 can cause the advertisement, which can include the live video stream, to be presented. For example, in some embodiments, the advertisement can be presented prior to presentation of media content and/or as a break in presentation of media content requested by advertisement viewing device 310. As another example, in some embodiments, the advertisement can be presented as a pop-up video prior to presentation of a page requested by advertisement viewing device 310. As yet another example, in some embodiments, the advertisement can be presented as a banner at a particular location of a page requested by advertisement viewing device 310.

The advertisement can be presented in any suitable manner. For example, as shown in and described above in connection with FIG. 2B, the live video stream can be presented with accompanying text specified in the advertisement parameters transmitted by advertiser device 308 at block 502. As another example, the advertisement can be associated with an action that is to be performed. In some embodiments, the action can include presenting directions to a location associated with the advertisement, causing a phone number associated with the advertisement to be dialed, and/or any other suitable action. In some embodiments, as shown in and described above in connection with FIG. 2B, the action can be performed in response to determining that a portion of the advertisement has been selected. Additionally or alternatively, in some embodiments, the action can be performed without user interaction. For example, in some embodiments, the action can be performed (e.g., directions to a location associated with the advertisement can be presented, and/or any other suitable action) in response to determining that the advertisement has been presented for a particular duration of time (e.g., that the advertisement has been presented for at least five seconds, and/or any other suitable duration), that a particular portion of the advertisement is currently being presented (e.g., that particular text has been presented), and/or based on any other suitable information.

Figure 6:
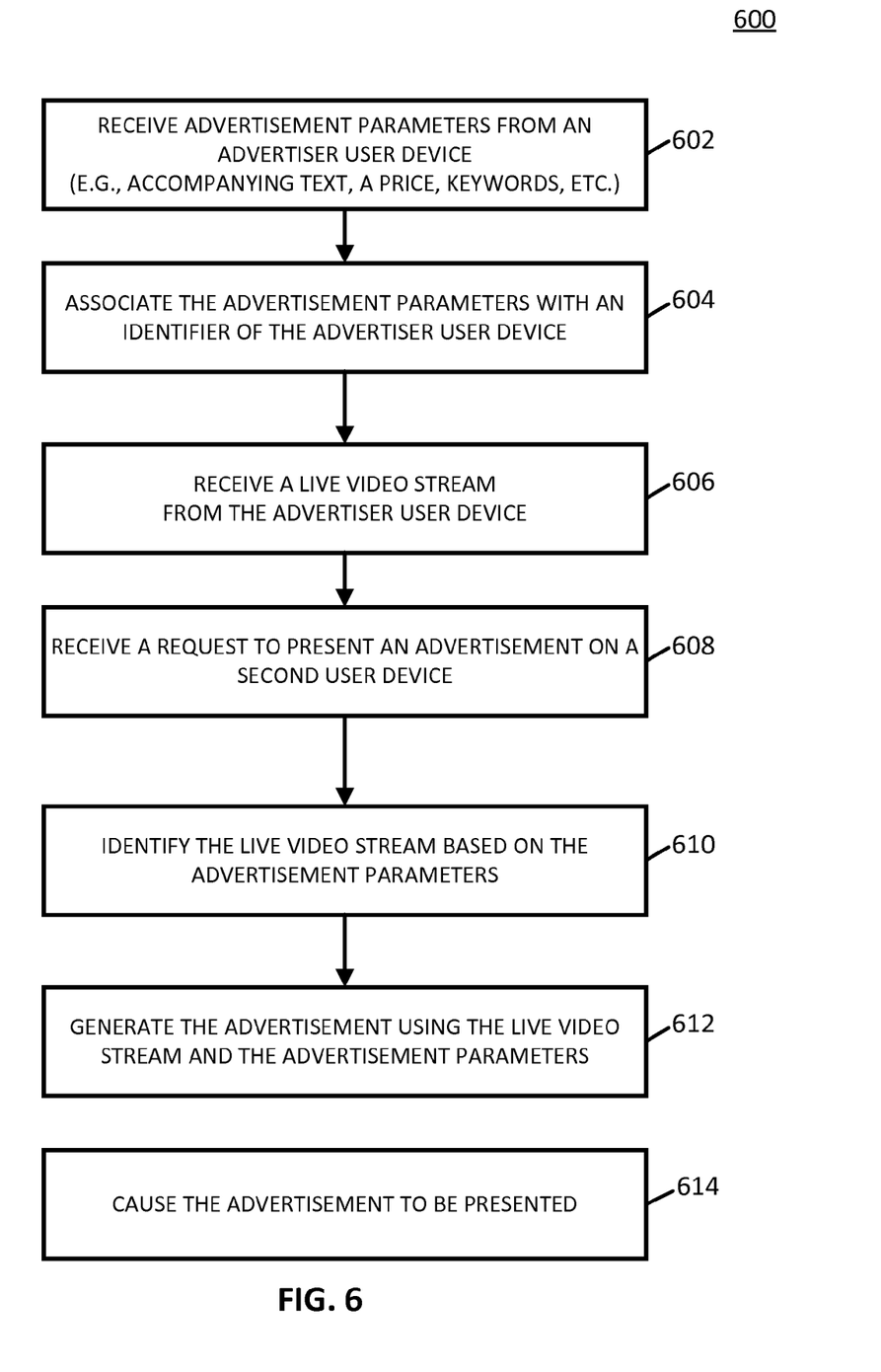
FIG. 6 shows an example of a process for receiving advertisement parameters and a live video stream and generating an advertisement using the live video stream and the advertisement parameters in accordance with some embodiments of the disclosed subject matter.

Turning to FIG. 6, an example 600 of a process for receiving advertisement parameters and a live video stream from an advertiser user device and causing an advertisement that includes the live video stream to be presented on a second user device is shown in accordance with some embodiments of the disclosed subject matter.

Process 600 can begin by receiving advertisement parameters from an advertiser user device at 602. As described above in connection with FIGS. 1 and 5, the advertisement parameters can be received from a user interface presented on the advertiser user device, and can include any suitable information related to an advertisement and/or a group of advertisements, such as text that is to be presented in connection with the advertisement, keywords associated with the advertisement, an action associated with the advertisement, a price associated with the advertisement, and/or any other suitable information.

Process 600 can associate the advertisement parameters with an identifier of the advertiser user device at 604. Process 600 can use any suitable information to associate the advertiser user device with the received advertisement parameters. For example, in some embodiments, the advertisement parameters can be transmitted from the advertiser user device from an application installed on the advertiser user device and/or in connection with a user account authenticated on the advertiser user device, and process 600 can associate the advertisement parameters with an identifier of the application and/or the user account. As another example, in some embodiments, process 600 can use any other suitable information associated with the advertiser user device, such as an IP address associated with the advertiser user device, a model number associated with the advertiser user device, a location associated with the advertiser user device, and/or any other suitable information.

Process 600 can receive a live video stream from the advertiser user device at 606. As described above in connection with FIG. 2B and block 506 of FIG. 5, the live video stream can be transmitted via communication network 306 from the advertiser user device to any suitable server, such as advertisement server 302, and can be transmitted in portions and/or fragments of any suitable duration and/or size. Note that, in some embodiments, process 600 can save the received video stream for use in the future at any suitable time (e.g., the next day, the next week, the next month, and/or any other suitable time), and, in such instances, the received video stream can be presented as a previously recorded video stream rather than a live video stream.

Process 600 can receive a request to present an advertisement on a second user device at 608. In some embodiments, the request can include any suitable information. For example, in some embodiments, the request can indicate a location (e.g., a city, a state, a zip code, global positioning system coordinates, and/or any other suitable location information) associated with the second user device. As another example, in some embodiments, the request can indicate content and/or a type of content that has been concurrently requested and/or is being concurrently presented on the second user device. As a more particular example, in some embodiments, the request can indicate that the second user device is currently presenting a particular media content item (e.g., a particular video, a particular move, a particular television program, a particular audiobook, and/or any other suitable media content). As another more particular example, in some embodiments, the request can indicate that the second user device is currently presenting a particular page (e.g., a page of search results, a page associated with a particular social networking service, and/or any other suitable page) and/or website. Additionally or alternatively, in some embodiments, the request can indicate a topic associated with content requested and/or being presented on the second user device.

At 610, process 600 can identify the live video stream for inclusion in an advertisement based on the advertisement parameters using any suitable information and any suitable technique(s). For example, in some embodiments, process 600 can compare information included in the request for the advertisement received at block 608 with keywords included in the advertisement parameters received at block 602. As a more particular example, process 600 can determine whether the keywords are relevant to a topic of content requested and/or being presented on the second user device. As a specific example, if the keywords are related to a restaurant that serves pizza, and the content requested and/or being presented on the second user device relates to a video about making pizza, process 600 can determine that the live video stream is relevant to the content on the second user device. As another more particular example, process 600 can determine whether the keywords are relevant to a location associated with the second user device. As a specific example, if process 600 determines that the keywords are associated with a restaurant located in a particular location that matches and/or is relatively near (e.g., within a predetermined distance) a location of the second user device, process 600 can identify the live video stream for inclusion in the advertisement. In some embodiments, process 600 can use metadata associated with content (e.g., that indicates a title of the content, a creator of the content, a topic of the content, and/or any other suitable information) requested and/or being presented on the second user device to determine if the live video stream is suitable for inclusion in the advertisement.

Process 600 can generate the advertisement using the live video stream and the advertisement parameters at 612 using any suitable technique(s). For example, in some embodiments, process 600 can cause text included in the advertisement parameters to be overlaid on the live video stream, as shown in and described above in connection with FIG. 2B. As another example, in some embodiments, process 600 can include instructions with the generated advertisement that cause a particular action to be performed (e.g., that a particular page and/or particular information is to be presented at a particular time point after the advertisement is first presented, that the action is to be performed in response to a portion of the advertisement being touched, clicked, and/or selected, and/or any other suitable instructions for performing the action), as described above in connection with FIGS. 2B and 5. Note that, in some embodiments, process 600 can use similar techniques to generate an advertisement that does not include a live video stream, such as an advertisement that includes a pre-recorded video stream, a live audio stream, a pre-recorded audio stream, a still image, and/or any other suitable type of content.

Note that, in some embodiments, process 600 can receive an indication from the advertiser user device at a time after the transmission of the live video stream from the advertiser user device has begun that indicates that the live video stream is not to be included in an advertisement. In some embodiments, if the indication is received within a predetermined time period (e.g., within five seconds of initial receipt of the live video stream, within ten seconds of initial receipt of the live video stream, and/or any other suitable time period), process 600 can delete any stored portions of the live video stream and/or can determine that the live video stream is not to be included in an advertisement presented on the second user device.

Additionally or alternatively, in some embodiments, process 600 can receive an indication that a particular portion of the live video stream (e.g., a portion between two particular time points) is to be stored for future inclusion in an advertisement (e.g., in an advertisement presented in the next week, in the next month, and/or at any other suitable future time).

Process 600 can cause the advertisement to be presented on the second user device at 614 using any suitable technique(s). For example, in some embodiments, process 600 can begin causing the advertisement, including the live video stream, to be transmitted (e.g., from advertisement server 302) to the second user device via communication network 306. In such embodiments, the live video stream can be transmitted in portions of any suitable duration and/or size.

In some embodiments, at least some of the above described blocks of the processes of FIGS. 5 and 6 can be executed or performed in any order or sequence not limited to the order and sequence shown in and described in connection with the figures. Also, some of the above blocks of FIGS. 5 and 6 can be executed or performed substantially simultaneously where appropriate or in parallel to reduce latency and processing times. Additionally or alternatively, some of the above described blocks of the process of FIGS. 5 and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for generating an advertisement from a video stream are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating an advertisement from a video stream, comprising:
   receiving, from a first user device, advertisement parameters associated with an advertisement campaign for placing an advertisement based on the advertisement parameters, wherein the advertisement parameters include one or more keywords and an indication of a time delay;
   associating the advertisement parameters with an identifier of the first user device;
   receiving, from the first user device, a live video stream and an image;
   receiving, from a second user device, a request to present an advertisement;
   identifying the live video stream based at least in part on the one or more keywords;
   determining that the advertisement to be presented on the second user device is to include a still image based at least in part on the request received from the second user device;
   generating the advertisement using the live video stream, the image, and the advertisement parameters;
   receiving, from the first user device, an indication to delete the live video stream at a time that is less than the time delay;
   inhibiting presentation of the advertisement that includes the live video stream on the second user device in response to receiving the indication to delete the live video stream;
   determining whether a period of time equivalent to the time delay has elapsed prior to causing the advertisement to be presented on the second user device; and
   causing the advertisement to be presented on the second user device in response to determining that the period of time equivalent to the time delay has elapsed.

2. The method of claim 1, further comprising performing an action based on the advertisement parameters in response to determining that a portion of the live video stream has been selected on the second user device.

3. The method of claim 2, wherein the action includes presenting directions to a location associated with the live video stream.

4. The method of claim 1, wherein the advertisement parameters include text, and wherein the advertisement includes text presented in connection with the live video stream on the second user device.

5. A system for generating an advertisement from a video stream, the system comprising:
   a hardware processor that is programmed to:
      receive, from a first user device, advertisement parameters associated with an advertisement campaign for placing an advertisement based on the advertisement parameters, wherein the advertisement parameters include one or more keywords and an indication of a time delay;
      associate the advertisement parameters with an identifier of the first user device;
      receive, from the first user device, a live video stream and an image;
      receive, from a second user device, a request to present an advertisement;
      identify the live video stream based at least in part on the one or more keywords;
      determine that the advertisement to be presented on the second user device is to include a still image based at least in part on the request received from the second user device;
      generate the advertisement using the live video stream, the image, and the advertisement parameters;
      receive, from the first user device, an indication to delete the live video stream at a time that is less than the time delay;
      inhibit presentation of the advertisement that includes the live video stream on the second user device in response to receiving the indication to delete the live video stream;
      determine whether a period of time equivalent to the time delay has elapsed prior to causing the advertisement to be presented on the second user device; and
      cause the advertisement to be presented on the second user device in response to determining that the period of time equivalent to the time delay has elapsed.

6. The system of claim 5, wherein the hardware processor is further programmed to perform an action based on the advertisement parameters in response to determining that a portion of the live video stream has been selected on the second user device.

7. The system of claim 6, wherein the action includes presenting directions to a location associated with the live video stream.

8. The system of claim 5, wherein the advertisement parameters include text, and wherein the advertisement includes text presented in connection with the live video stream on the second user device.

9. A non-transitory computer-readable medium containing computer executable instructions that, when executed by a processor, cause the processor to perform a method for generating an advertisement from a video stream, the method comprising:
   receiving, from a first user device, advertisement parameters associated with an advertisement campaign for placing an advertisement based on the advertisement parameters, wherein the advertisement parameters include one or more keywords and an indication of a time delay;
   associating the advertisement parameters with an identifier of the first user device;
   receiving, from the first user device, a live video stream and an image;
   receiving, from a second user device, a request to present an advertisement;
   identifying the live video stream based at least in part on the one or more keywords;
   determining that the advertisement to be presented on the second user device is to include a still image based at least in part on the request received from the second user device;

generating the advertisement using the live video stream, the image, and the advertisement parameters;

receiving, from the first user device, an indication to delete the live video stream at a time that is less than the time delay;

inhibiting presentation of the advertisement that includes the live video stream on the second user device in response to receiving the indication to delete the live video stream;

determining whether a period of time equivalent to the time delay has elapsed prior to causing the advertisement to be presented on the second user device; and causing the advertisement to be presented on the second user device in response to determining that the period of time equivalent to the time delay has elapsed.

10. The non-transitory computer-readable medium of claim 9, wherein the method further comprises performing an action based on the advertisement parameters in response to determining that a portion of the live video stream has been selected on the second user device.

11. The non-transitory computer-readable medium of claim 10, wherein the action includes presenting directions to a location associated with the live video stream.

12. The non-transitory computer-readable medium of claim 9, wherein the advertisement parameters include text, and wherein the advertisement includes text presented in connection with the live video stream on the second user device.

* * * * *